July 2, 1940.  A. R. WHITTAKER  2,206,540
TEMPERATURE COMPENSATED FLUID MEASURING SYSTEM
Filed Oct. 3, 1938   2 Sheets-Sheet 1

INVENTOR
ALEXANDER R. WHITTAKER
BY
James K. Franklin
ATTORNEY

July 2, 1940.                A. R. WHITTAKER                2,206,540
TEMPERATURE COMPENSATED FLUID MEASURING SYSTEM
Filed Oct. 3, 1938                2 Sheets-Sheet 2

INVENTOR
ALEXANDER R. WHITTAKER
BY
James & Franklin
ATTORNEY

Patented July 2, 1940

2,206,540

UNITED STATES PATENT OFFICE 2,206,540

TEMPERATURE COMPENSATED FLUID MEASURING SYSTEM

Alexander R. Whittaker, New York, N. Y., assignor to National Meter Company, Brooklyn, N. Y., a corporation of New York Application October 3, 1938, Serial No. 232,978

4 Claims. (Cl. 73—233)

This invention relates to meters and more particularly to a temperature compensated metering system for fluid measurement.

Meters of the displacement type, such as those using pistons of the rotary or wobble type, are commonly used for measuring fluids or liquids. The resulting measurement is essentially one of volume rather than true mass or weight. This fact is of no consequence when dealing with an inexpensive liquid such as water, but becomes important when measuring a more expensive liquid such as oil. The primary object of the present invention is to compensate for temperature variation while metering fluids. It has heretofore been proposed to use a friction drive including a cone, the speed being varied by movement along the cone, and it has also been proposed to use a complicated linkage mechanism in which a part of the linkage is shifted. The first arrangement is inherently inaccurate because of the friction drive, and the second arrangement is unsatisfactory because it necessitates changing the rotary movement of the meter to a reciprocating movement, following which the reciprocating movement must be changed back again into a rotary movement. These transformers of motion themselves require friction clutches and are unsatisfactory for that further reason.

A more specific object of the present invention is to provide for temperature compensation while using an accurate meter system including a true displacement meter; while transmitting rotary movement from the meter to the driven device, usually a register, without intermediate transformation of the rotary movement into a reciprocating movement; and while driving the register from the meter with a positive drive, insuring accuracy accompanied by a minimum of frictional resistance to rotation of the meter.

Still another object of the invention resides in the provision of temperature compensating mechanism which is adapted to be fitted between a conventional meter and a conventional register with but slight modification of the meter and no modification at all of the register.

To the accomplishment of the foregoing and such other objects as will hereinafter appear, my invention consists in the metering and temperature compensating elements and their relation one to the other, as hereinafter are more particularly described in the specification and sought to be defined in the claims. The specification is accompanied by drawings, in which:

Figure 1:
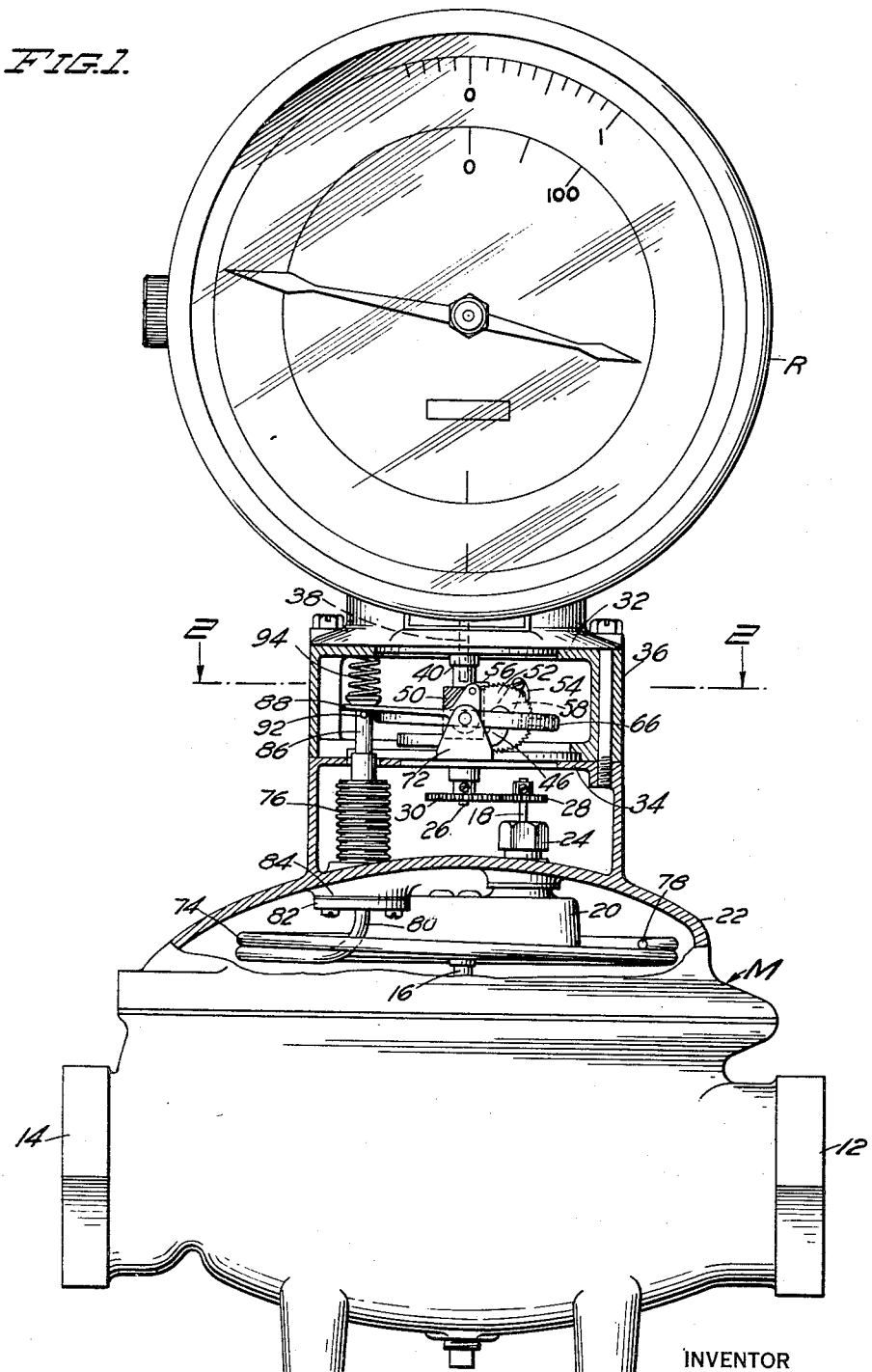
Fig. 1 is a partially sectioned front elevation of a temperature compensated metering system embodying the invention, the section being taken in the plane of the line 1—1 of Fig. 2.

Referring to the drawings, the complete system comprises a meter M which may be of conventional type, a device driven thereby, here shown as a register R which may be of conventional type, and temperature compensating mechanism associated therewith. The meter M has the usual inlet and outlet passages 12 and 14. The meter piston rotates shaft 16 which through an appropriate train of gearing or so-called intermediate drives a shaft 18. The intermediate gearing is housed in a gear housing 20 which is carried within the meter body 22 and is therefore immersed in the liquid being measured. This liquid is confined within the meter body, and to prevent it from rising upward above the meter body, it is customary to surround the shaft 18 with packing, which in the present case is controlled by a nut 24. Shaft 18 drives a shaft 26 through gears 28 and 30.

The register R is here shown of the face reading type, but may also be of the digit wheel or Geneva transfer type. In either case, the register terminates at the bottom in a flange 32 which is dimensioned to be received on top of a flange 34 formed on the cover 22 of the meter body. Ordinarily, the register is mounted directly on flange 34, but in the present case the approximately cylindrical housing 36 is inserted therebetween. The register shaft 38 is substantially concentric with the housing and is received in a collar 40. The register shaft is thus coaxial with the shaft 26, and ordinarily, in the absence of the compensating mechanism, the shaft 26 would correspond to the register shaft. For purposes of description of the present invention, it is convenient to refer to the shaft 26 as the meter shaft and the shaft 38 as the register shaft.

The shafts 26 and 38 are coupled together by mechanism which rotates the shafts in a positive manner in unison, and which in addition superposes a slight relative movement which causes a slight difference in the rotation of shaft 38 relative to shaft 26. Mechanism of this character is disclosed in Bergman Patents Nos. 2,079,197, issued May 4, 1937, and 2,111,547, issued March 22, 1938. The mechanism here disclosed is substantially like that shown in Figs.

Figure 2:
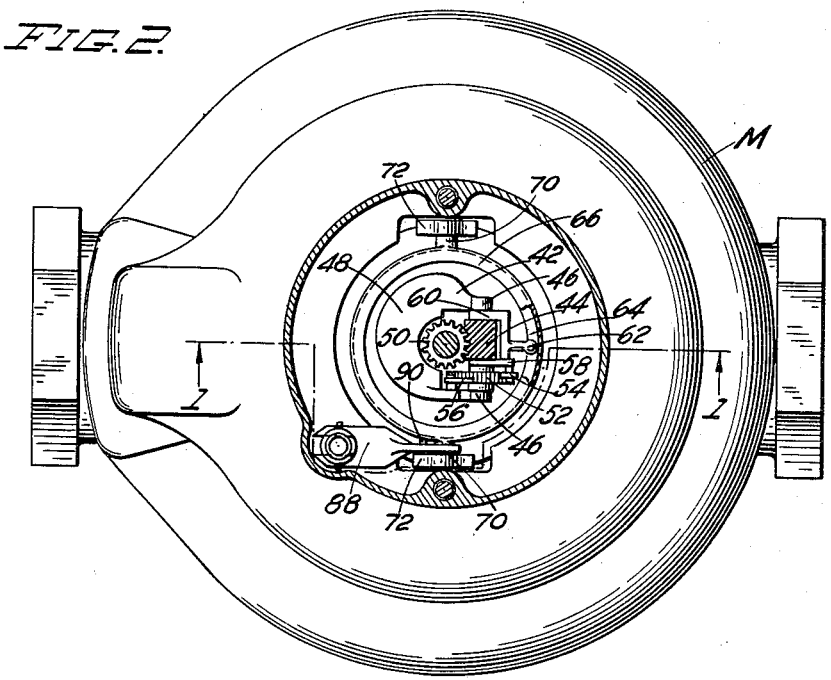
Fig. 2 is a horizontal section taken in the plane of the line 2—2 of the line 2—2 of Fig. 1.

1 through 4 of the earlier Bergman patent. A detailed description is therefore probably unnecessary, but briefly, it may be explained that shaft 26 turns with it a frame 42 (Fig. 2) carrying a worm 44. The frame 42 is so formed as to provide bearings 46 for the wormshaft and a counterweight 48 which keeps the rotating parts in balance. Worm 44 meshes with a worm gear 50 which in turn carries the collar 40 which is secured to the register shaft 38. It will be understood that when the meter shaft 26 rotates, it revolves the worm 44, and the teeth of worm 44 being locked to the teeth of worm gear 50, the latter is also rotated so that the shafts 26 and 38 are turned in unison provided, of course, that the worm 44 is not rotated on its own axis. It is convenient to distinguish between revolution of the worm, which refers to its bodily movement about the shaft axes, and rotation of the worm, which refers to its movement on its own horizontal axis.

Worm 44 is secured to and may be rotated by a ratchet wheel 52. This is controlled by an operating pawl 54 and a holding pawl 56. The operating pawl 54 is carried by an arm 58 which is oscillatable about the wormshaft. Arm 58 is supplemented by a branch arm 60, and the resulting yoke carries an extension 62 having a ball at the end which is received within a groove 64 formed at the inside of a ring 66. Ring 66 concentrically surrounds the shafts 26 and 38. It is mounted on horizontal diametrically opposed trunnions 70 which are carried in suitable stationary bearings 72. With the ring 66 in horizontal position, the shaft 26 drives the shaft 38 in one-to-one ratio. However, if the ring 66 is tilted somewhat, it causes an oscillation of the pawl arm during each rotation of shaft 26, and this in turn causes a slight movement of the ratchet wheel and consequently of the worm. The movement imparted to shaft 38 is thus made slightly different from the movement of shaft 26. The amount of this difference is readily adjusted or regulated by changing the amount of tilt of the ring 66.

In Bergman Patent No. 2,079,197 previously referred to, this tilt was manually adjustable in order to regulate the accuracy of the reading of a meter where a high degree of precision was desired, say, one-tenth of one per cent. For that purpose, the reduction ratio between the worm 44 and the worm gear 50 was relatively high, and the total range of change or accuracy regulation was at most, say, three per cent. For the present purposes, a greater range may be desired depending on the conditions to be met. For example, in handling oil at bulk stations, the variation in volume which changes in temperature may be a matter of, say, four or five per cent. At refineries, the conditions may be very different. There may be higher temperatures yet only a smaller range of temperature. The particular unit which happens to be shown in the drawings has been designed to cover a range of eight per cent, and the ratio between worm 44 and worm gear 50 is, therefore, greatly reduced; in fact, the worm and worm gear become in effect simply spiral or helical gears, but it is convenient to refer to the revolving driving gear 34 as a worm, and the driven gear 50 as a worm gear, in order to distinguish between one and the other. With the same number of teeth on the ratchet wheel, there is some sacrifice in the precision to which the mechanism will operate, but this simply means that a change in reading will not take place until after there has been an appreciable change in temperature, yet an accuracy of, say, three-tenths of a per cent is obtainable and is adequate for the present purpose. Moreover, a larger ratchet wheel with more teeth may be used, thus retaining high accuracy of adjustment.

Figure 3:
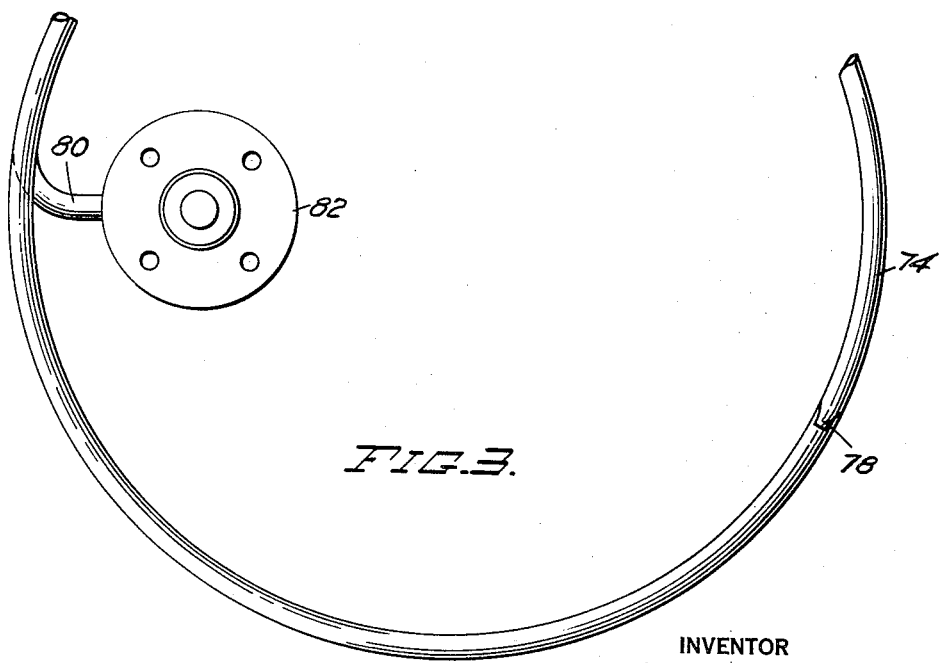
Fig. 3 is a plan view of the temperature responsive element drawn to enlarged scale.

The ring 66 is tilted in response to movement of a suitable temperature responsive element. In the present case, the movement is obtained by expansion or contraction of a liquid carried in a tube or so-called "bulb" 74, said expansion being manifested in a suitable expansion bellows 76. The tube 74 is coiled in a manner which would be clearly understood from examination of Figs. 1 and 3. The free end 78 is sealed. The opposite end 80 is connected through a flange 82 to the expansion bellows 76. The lower end of the expansion bellows is fixedly mounted on the member 82, while the upper end is movable. Flange 82 is secured to a mating seat 84 on the underside of cover 22, and this provides a liquid seal. The circular configuration of tube 74 is convenient because it may surround the intermediate 20 and thus be immersed in the liquid passing through the meter without taking up any essential room in the meter body.

The upper end of the expansion bellows is connected to a vertically reciprocable post 86 which passes freely through the bifurcated end of an arm 88 the opposite end of which is secured to one of the trunnions 70 of ring 66. Relative movement of the arm and ring may be prevented as by the use of an auxiliary pin 90. Post 86 is provided with a cross-pin 92 on which arm 88 rests. The arm is held against pin 92 by means of a compression spring 94. The spring has no effect on the expansion of the bellows and functions merely as a restoring spring so that the arm 88 will follow contraction as well as expansion of the bellows.

It will be understood that movement of the bellows changes the tilt of ring 66 and consequently changes the ratio of movement of meter shaft 26 and register shaft 38. In the specific case here illustrated, the bellows is shown in Fig. 1 at substantially one end of its range of movement, that is, it is nearly in horizontal position. At the other end of its range of movement, it is tilted to a substantial angle. The range of temperature depends on the particular field of use. This range is preferably covered without actually reaching the extreme of movement in either direction, that is, some leeway is preferably allowed at both ends of the range. The quantity to be delivered is often specified at 60° F., and in such case the gear ratio in the intermediate 20 is so selected as to make the meter read correctly at that temperature. With a liquid temperature of less than 60° F., the reading of the register is increased somewhat, while with a liquid at a temperature greater than 60° F., the reading of the register is reduced somewhat relative to the theoretical reading which would otherwise be obtained in response to the meter.

It is believed that the construction and operation, as well as the many advantages of the invention, will be apparent from the foregoing detailed description thereof. It will also be apparent that while I have shown or described the invention in a preferred form, many changes and modifications may be made without departing from the spirit of the invention defined in the following claims.

I claim:

1. A temperature compensated fluid measuring system comprising a displacement meter including an enclosed body having in the upper part thereof an intermediate terminating in a meter shaft, a driven shaft, means rotatably connecting said meter shaft to said driven shaft, said means including a worm and related gearing all bodily rotatable with said shafts for positively locking said shafts together for rotation in unison with one another, additional means for intermittently causing a slight rotation of the worm on its own axis during each rotation of the shafts in order to produce a slight difference in the rotation of one shaft relative to the other, adjustment means to vary the extent of movement of the worm on its own axis during each rotation of the shafts, and temperature responsive means immersed in the fluid in the meter and mechanically connected to the adjustment means for changing the adjustment in response to changes in temperature, said means comprising a liquid-filled bulb in the form of a coil of tubing located within the meter body around the intermediate and connected to an expansion bellows having one end fixed and the other end movable, the movable end being connected to the adjusting means.

2. A temperature compensated fluid measuring system comprising a displacement meter terminating in a meter shaft, a driven shaft, means rotatably connecting said meter shaft to said driven shaft, said means including a train of gears meshing with one another and bodily rotated with the shafts, a ratchet wheel secured to one of the gears, a pawl for intermittently moving the ratchet wheel, an oscillatable arm for moving the pawl, a grooved ring tiltably mounted on diametrically opposed trunnions about the shafts, said oscillatable arm being received in the grooved ring and being oscillated thereby during each rotation of the shafts, and temperature responsive means immersed in the fluid being measured and mechanically connected to the ring for changing the tilt thereof in response to changes in temperature, said means comprising a liquid-filled bulb within the meter body and an expansion bellows having one end fixed and the other end movable, the movable end being connected to the ring.

3. A temperature compensated fluid measuring system comprising a displacement meter terminating in a meter shaft, a driven shaft, means rotatably connecting said meter shaft to said driven shaft, said means including a worm and worm gear meshing with one another and bodily rotated with the shafts, a ratchet wheel secured to the worm, a pawl for intermittently moving the ratchet wheel, an oscillatable arm for moving the pawl, a ring adjustably mounted about the shafts, said oscillatable arm being oscillated by the ring during each rotation of the shafts an amount dependent on the adjustment of the ring, and temperature responsive means immersed in the fluid being measured and mechanically connected to the ring for changing the adjustment thereof in response to changes in temperature, said means comprising a liquid-filled bulb within the meter body and an expansion bellows having one end fixed and the other end movable, the movable end being connected to the ring.

4. A temperature compensated fluid measuring system comprising a displacement meter terminating in a meter shaft, a driven shaft, means rotatably connecting said meter shaft to said driven shaft, said means including a worm and worm gear meshing with one another and bodily rotated with the shafts, a ratchet wheel secured to the worm, a pawl for intermittently moving the ratchet wheel, an oscillatable arm for moving the pawl, a grooved ring tiltably mounted about the shafts on diametrically opposed trunnions, said oscillatable arm being received in the grooved ring and being oscillated thereby during each rotation of the shafts, and temperature responsive means immersed in the fluid in the meter and mechanically connected to the ring for changing the tilt thereof in response to changes in temperature, said means comprising a liquid-filled bulb located within the meter body and connected to an expansion bellows outside the meter body having one end fixed and the other end movable, the movable end being connected to the ring.

ALEXANDER R. WHITTAKER.